US008713625B2

(12) United States Patent
Blanchard et al.

(10) Patent No.: US 8,713,625 B2
(45) Date of Patent: Apr. 29, 2014

(54) DELIVERY OF CAPTIONS, CONTENT ADVISORY AND OTHER DATA THROUGH DIGITAL INTERFACE

(75) Inventors: Robert Blanchard, Escondido, CA (US); Mark Kenneth Eyer, Woodinville, WA (US); Peter Rae Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 274 days.

(21) Appl. No.: 12/912,990

(22) Filed: Oct. 27, 2010

(65) Prior Publication Data

US 2011/0128442 A1 Jun. 2, 2011

Related U.S. Application Data

(60) Provisional application No. 61/265,722, filed on Dec. 1, 2009.

(51) Int. Cl.

| | |
|---|---|
| ***H04N 7/16*** | (2011.01) |
| ***H04N 7/167*** | (2011.01) |
| ***H04N 3/00*** | (2006.01) |
| ***H04N 5/445*** | (2011.01) |
| ***H04N 7/173*** | (2011.01) |
| ***H04N 7/00*** | (2011.01) |
| ***H04N 11/00*** | (2006.01) |

(52) U.S. Cl.
USPC ............... 725/136; 725/137; 725/31; 725/51; 725/61; 725/112; 348/468; 348/473; 348/552

(58) Field of Classification Search
USPC ....... 348/473, 563, 9, 584, 739, E05; 386/95; 709/231; 725/135, 90; 375/240
See application file for complete search history.

(56) References Cited

U.S. PATENT DOCUMENTS

| | | | | |
|---|---|---|---|---|
| 5,859,660 | A * | 1/1999 | Perkins et al. | 725/32 |
| 2005/0073608 | A1 * | 4/2005 | Stone et al. | 348/468 |
| 2007/0136777 | A1 | 6/2007 | Hasek et al. | |
| 2008/0129864 | A1 | 6/2008 | Stone et al. | |
| 2009/0051820 | A1 * | 2/2009 | Oikawa | 348/705 |
| 2009/0058868 | A1 * | 3/2009 | Kang et al. | 345/581 |

OTHER PUBLICATIONS

"HDMI Licensing, LLC Announces Features of the Upcoming HDMI Specification Version 1.4", published May 27, 2009, retrieved from internet <http://www.hdmi.org/press/press_release.aspx?prid=101> on Sep. 5, 2012.*
HDMI Licensing, "HDMI FAQ," HDMI Learning Center, Publication Unknown. © 2003-2010.

* cited by examiner

*Primary Examiner* — Joshua Taylor
*Assistant Examiner* — Adil Ocak
(74) *Attorney, Agent, or Firm* — Miller Patent Services; Jerry A. Miller

(57) ABSTRACT

In certain implementations, closed captioning data can be packaged in IP packets and transmitted over an HDMI interface to permit closed captioning data to be rendered at a television set or other HDMI sink closer to the TV set rather than at a source so as to more closely match the capabilities of the display device. This abstract is not to be considered limiting, since other embodiments may deviate from the features described in this abstract.

32 Claims, 3 Drawing Sheets

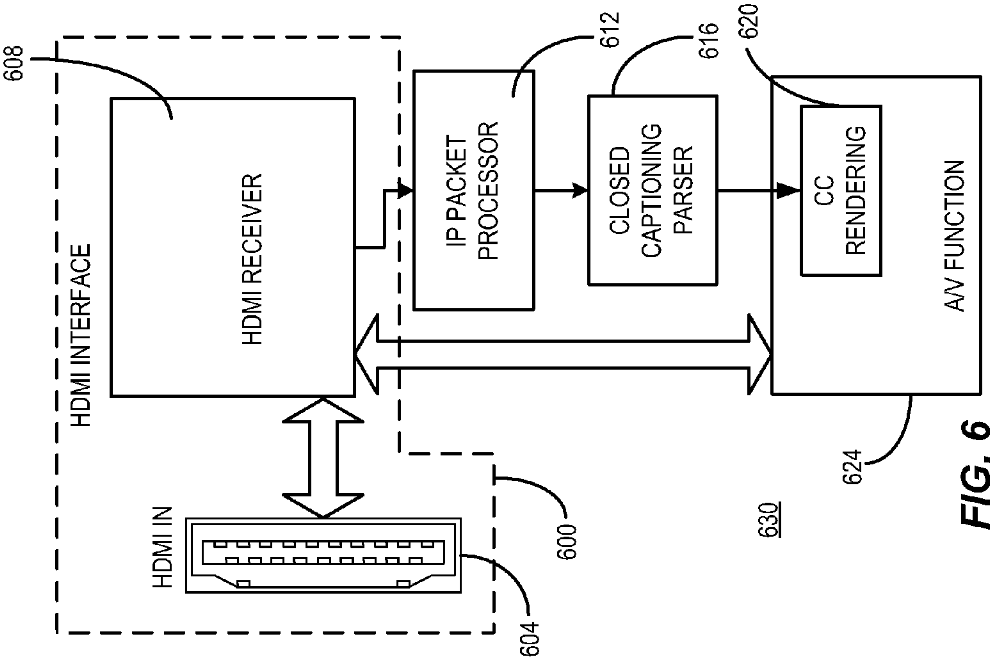
FIG. 6
FIG. 5
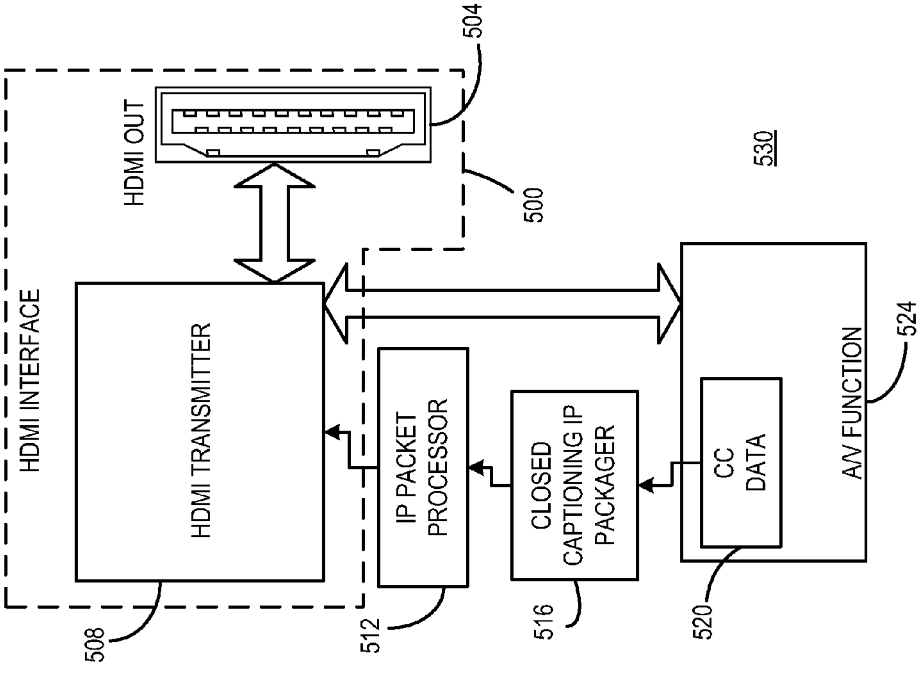

DELIVERY OF CAPTIONS, CONTENT ADVISORY AND OTHER DATA THROUGH DIGITAL INTERFACE

CROSS REFERENCE TO RELATED DOCUMENTS

This application is related to and claims priority benefit of U.S. Provisional Patent Application 61/265,722 filed Dec. 1, 2009 which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Closed captioning services provide textual representation of spoken audio content for the benefit of hearing-impaired viewers, or for anyone desiring such output. When the audio/video content is delivered via a High-Definition Multimedia Interface (HDMI) interface, captioning is rendered by the source rather than the TV (as it was with traditional analog TV). This can create user confusion and varying quality of closed captioning display results.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 5 is an example block diagram of an HDMI transmitter device implemented in a manner consistent with certain embodiments of the present invention.

FIG. 6 is an example block diagram of an HDMI receiver device implemented in a manner consistent with certain embodiments of the present invention.

DETAILED DESCRIPTION

Figure 1:
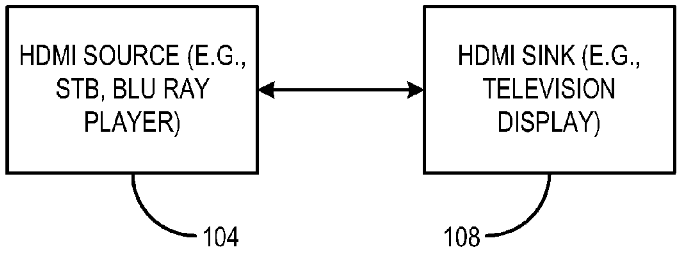
FIG. 1 is an example of an HDMI-connected two-component audio/video (A/V) system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accord with the present teachings, closed captioning data can be passed over an HDMI interface. Moreover, data for captioning, content advisories including the ATSC Program and System Information Protocol (PSIP) Rating Region Table (RRT), and program-related metadata can be aggregated and packaged for carriage across digital interfaces such as Ethernet and HDMI (though not limited to those specific interface types). This includes the full transport stream or partial transport stream containing elementary components of one or more programs.

In the past, analog interfaces could easily carry in the vertical blanking interval of the NTSC video waveform caption data, content advisory data, and other metadata such as metadata used for audience measurement. However, with digital television, the data is not carried in the same manner and there is difficulty in making this type of data available to devices that may be on the downstream end of various digital interfaces. More precisely, at the time of this writing, a standard method to extract, package, and transport caption data, content advisory data, and other metadata for carriage across digital interfaces does not exist. The present subject matter enables a method based upon a simple format that can be applied to a multitude of different digital interfaces.

For example, in hardware compatible with the HDMI version 1.3 digital interface, the information does not necessarily have to be put into IP packets, but could be put into byte-sized pieces that could be conveyed via the AVI info frame packets. The data can also be carried by the Consumer Electronics Control (CEC) bus within the HDMI interface. A third method could potentially utilize the currently idle reserved line, pin 14 of the current connector interface. This line alone or in conjunction with another line could be used to form another signaling/communication bus within the HDMI interface. Since this last bus has not been standardized, there is an opportunity to prepare an IP packetized/friendly version that could be used here. One additional benefit of the IP version of carriage is that it is much easier to convey the content advisory and parental rating information beyond merely the HDMI interfaced devices, and allows it to be more easily conveyed to other networked devices.

Version 1.4 of the HDMI interface included an Ethernet interface. IP packets may be placed directly by the source device on this interface and multicast-addressed to all devices on the local subnet.

As noted previously, in current practice, closed caption data for HDMI-connected TV sets is rendered at the source rather than the TV. It is possible for closed caption (CC) data to be rendered at several locations along a television signal path between the source of the content and the display. However, in many cases, and particularly with HDMI interfaces, the closed captioning data is conventionally rendered at the source rather than at the TV. So, for example, if one receives a television signal from a cable television company and connects the TV to the cable system via a set top box (STB) using an HDMI connection, the closed captioning is rendered by the STB and not the TV.

This can create user confusion and varying quality of closed captioning display results. In addition, it is often the case that when closed caption data is not rendered at the display device, it can sometimes be inconveniently placed or even appear to be partially out of the frame since the television display may be displaying in a format that is different from that which is presumed by the author of the CC content.

For example, CC data can be rendered at a television set top box (STB) as an image (by turning on closed captioning on the STB), that is then sent to a television set as video image data with the CC data present in the image. When the image is displayed on a television set, the television set may be operating in a mode which is not fully compatible with the STB rendering. For example, the STB may render the image in a wide image format that is displayed (as a result of user selection or TV capabilities) as a narrower image on the TV. In this case, each side of the image, including the CC text, may be cropped and thus made unusable to the viewer. Had the CC data been rendered at the TV, the image would have been rendered in a manner consistent with the display setting of the television. Consequently, it is usually better for the closed caption image to be rendered at the television display itself rather than anywhere up the signal chain from the TV. But this is contrary to the HDMI interface design which dictates and supposes that CC data is to be rendered by the source.

A viewer may have available several different source devices capable of delivering audio/video signals, including captioning to the display. For example, he or she may own and use two or more of: a video recorder, a Blu-ray or DVD player, a cable set-top box, a terrestrial broadcast set-top box, or a satellite set-top box. Each of these may support closed caption functions. In order for the user to enjoy the closed captioning feature, he or she must operate each of these different source devices, for example to switch on and off closed captioning mode. It would be far more convenient if the control of closed captioning functions could be done by operating one device, via a single remote control. That one device should be the common connection point for all these source devices: the display.

In order for this situation to be resolved, a mechanism should be provided for the CC data to be transferred from an HDMI source device to an HDMI sink device, where the sink device is either the television displaying device or is more closely in touch with the TV capabilities than the source device. This situation is illustrated in the examples below.

Turning now to FIG. 1, an example of a Blu-ray player or STB 104 as an HDMI source device is depicted. In this example, the Blu-ray player or STB 104 is a source device, but there is currently no provision in the HDMI specifications through version 1.4 that defines a mechanism for the transfer of closed captioning information to the sink device, which in this case is the television set 108. Hence, in this example situation, if one wishes to view the closed captioning information, it must be rendered on the Blu-ray player or STB 104 and passed to the HDMI sink device 108 as rendered video data. The television 108 then displays the video data with the closed captioning in the manner rendered by the STB or Blu-ray player. If the Blu-ray player 104 playing a DVD, the closed captioning data and video may be rendered in a number of ways—some of which might not be optimal for display on the television display 108.

Figure 2:
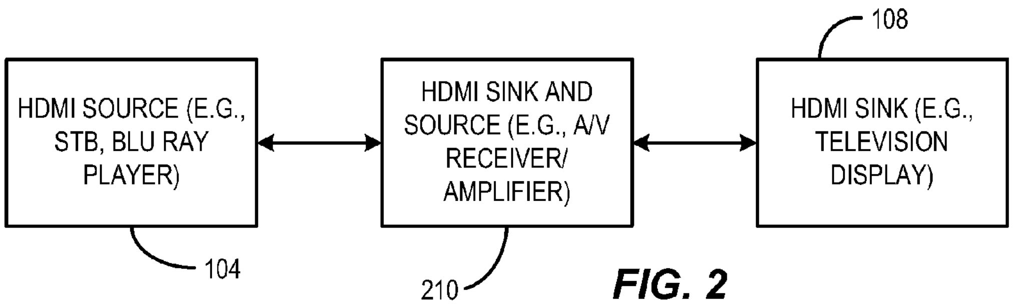
FIG. 2 is an example of an HDMI connected three-component A/V system consistent with certain embodiments of the present invention.

Referring to FIG. 2, the HDMI source device 104 may be connected to the sink device 108 via an intermediate device such as an audio/video (A/V) receiver 210. In this situation, it is to be understood that the intermediate HDMI device 210 serves as a sink device when referenced to source 104, but serves as a source device when referenced to sink device 108. In order to permit the closed captioning data to be rendered at the display device 108, then the CC data has to be passed from 104 to 210 to 108. Since the HDMI specification has no provision for passing CC data, the only choice again is for the CC data to be rendered to video at the source 104 and the video to pass to the sink 108 via intermediate devices such as 210. The situation becomes potentially even more complex when the various devices are made by different manufacturers. Moreover, when the source device is a STB, the service provider may have conflicting objectives compared with those of the various other A/V device manufacturers in that the service provider may wish to dominate the viewer's use of the remote control so as to facilitate sales of additional functions such as video on demand. However, as noted above, when the CC data is rendered anywhere other than at the ultimate display device, the closed captioning may be difficult for a hearing impaired user to optimally utilize.

Accordingly, it is desirable to provide a mechanism to assure that closed captioning data is always renderable at the display device so as to assure optimum display of the closed captioning, and for ease of use and convenience of access. This problem can be addressed by utilizing the Ethernet channel or the CEC signals provided in the HDMI specification to permit the CC data to be passed via the HDMI interface through the HDMI compatible devices to the display. This can be implemented by using the Internet Protocol (IP) channel capabilities of the HDMI interface definition and by passing CEA-708 compliant CC data packets within the IP channel or by use of other provisions such as the CEC signaling channel of the HDMI interface to pass CC data.

Figure 3:
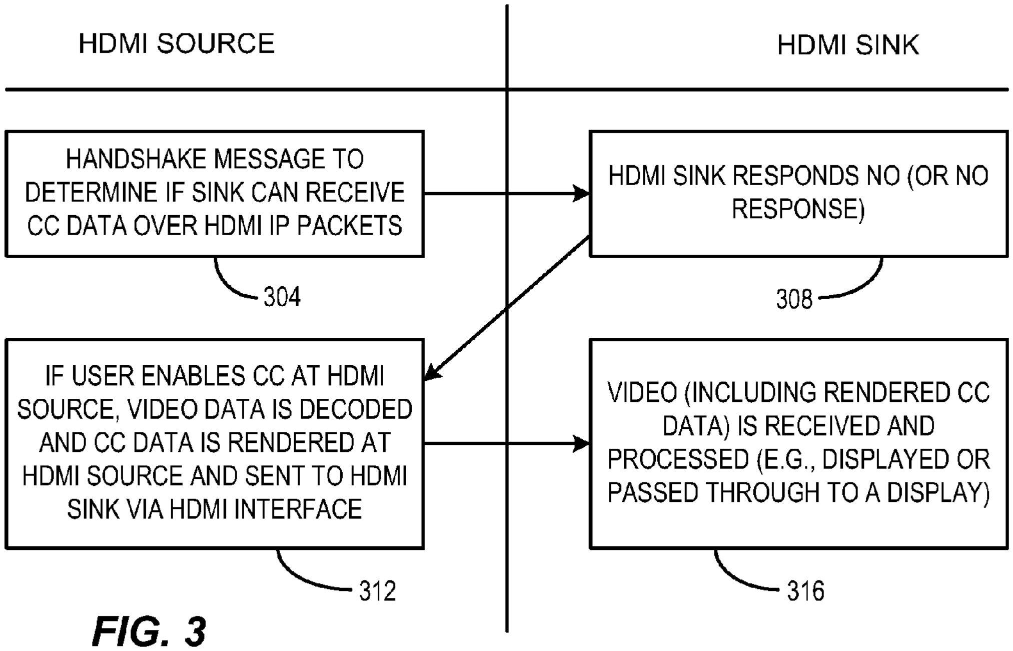
FIG. 3 is an example signal flow diagram consistent with certain embodiments of the present invention.

Referring to FIG. 3, a signal flow diagram depicts the operation of HDMI source and sink interfaces in a manner consistent with certain implementations where an HDMI source attempts to send CC data over an HDMI interface to an incompatible HDMI sink (i.e., one that cannot communicate CC data over IP packets). Communication of the CC data over the HDMI interface can be implemented using either the HDMI 1.4 or greater Ethernet channel using CC data encapsulated in IP packets where multicast-addressed IP packets encapsulate closed captioning data structures, with the IP packets including a "type" header signifying that the data is CC data which is followed by a number of data bytes. Alternatively, a registered multicast IP address and port number could be registered with the Internet Assigned Numbers Authority (IANA) to identify that these IP packets carry CC data. In such an implementation, the HDMI source should determine if the HDMI sink has the ability to receive and process CC data packets in the desired format. Such determination is accomplished by the source initiating a handshake at 304 with the sink that includes a query message to determine the capabilities of the HDMI sink. If the HDMI sink either fails to respond or responds with a message at 308 that indicates that the sink is unable to handle CC data, then the HDMI source operates in the conventional manner of rendering the CC at the HDMI source device if the user has enabled CC rendering at the HDMI source at 312. The rendered video is then passed over the HDMI interface from 312 to 316 where the video is displayed or passed to the next device in the A/V signal chain by the HDMI sink device.

It is noted that the query at 304 can include a query as to the highest level of HDMI that is supported by the sink. A reply of 1.3 or lower may be indicative that the HDMI sink cannot process the CC data. Similarly, a failure to explicitly reply, an error indication, or an explicit "no" response can all be considered a negative response in the context of this discussion.

Figure 4:
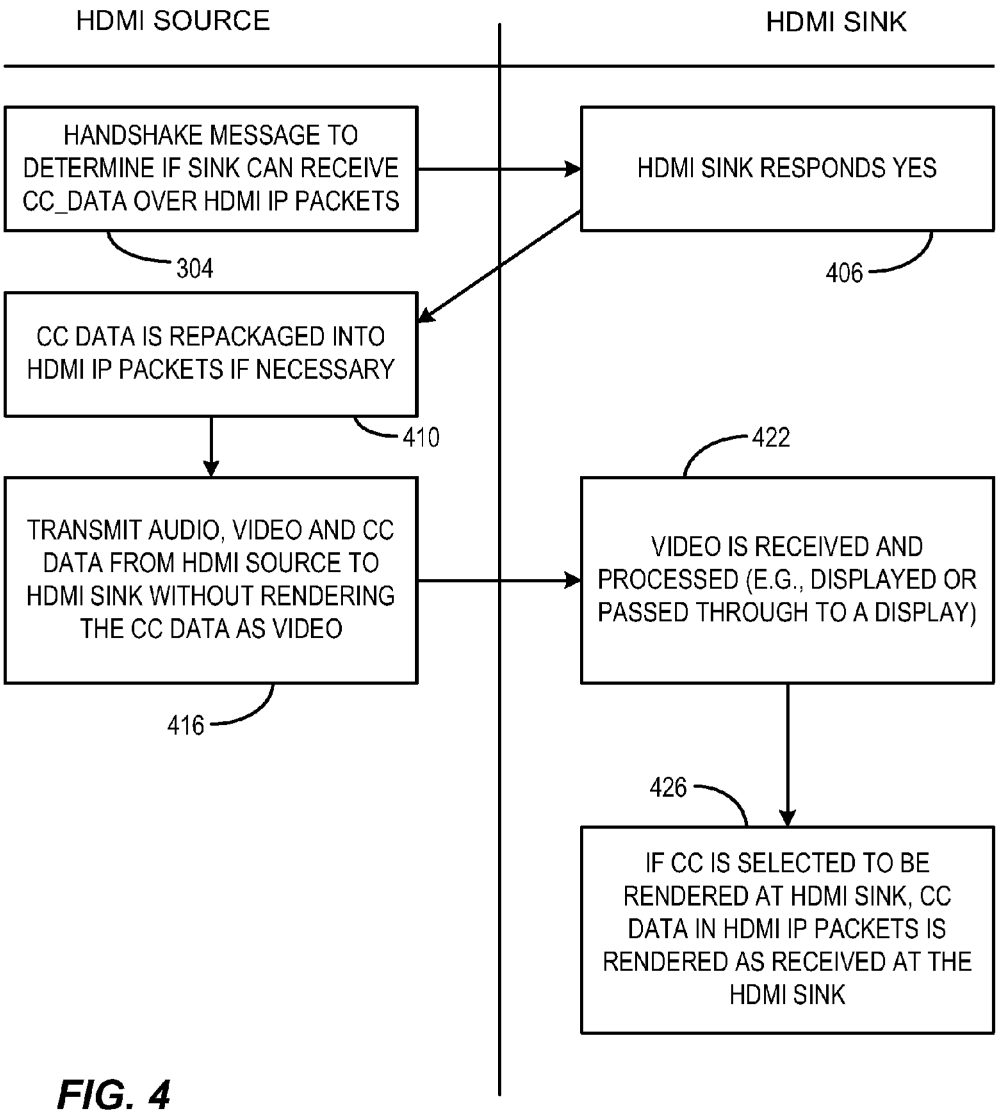
FIG. 4 is an example signal flow diagram consistent with certain embodiments of the present invention.

Referring now to FIG. 4, the desired operation of a pair of HDMI interfaces that can support communication of CC data in IP packets is depicted in which the same handshake message 304 is issued from the HDMI source to the HDMI sink across the HDMI interfaces. This can utilize the Display Data Channel (DDC), Ethernet channel, CEC communication or any other mechanism available via the HDMI interface. The handshake message, in this example, receives a response from the HDMI sink indicating that it can handle CC data at 406. It is noted that in the absence of standardization of the HDMI communication of CC data in a later version of the HDMI standard, the response should explicitly state that it is capable of receipt and processing of CC data. In the event that a later version of HDMI standardizes the present subject matter, then a response as to the current version of HDMI indicating support for this function is then adequate.

Upon receipt of an affirmative response to the query at 406 the CC data is either repackaged, packaged or retained as HDMI IP packets at 410 for communication from the HDMI source to the HDMI sink at 416 without rendering the CC data within the uncompressed video. If the CC data is already packaged as an IP packet (e.g., in the case of an intermediate HDMI device transferring the CC data to another sink device) then there is no need to package the CC data since the IP packets containing the CC data can simply be retained. The video and CC data are received at 422 and either displayed as video in the case of the HDMI sink embodying a TV display, or passed through to the next component in the signal chain. If CC rendering is selected at 426, the closed captioning data is rendered to video at the HDMI sink at 426. This can be the case whether or not the A/V device associated with the HDMI sink is a display.

Thus, as depicted and described above, a method carried out at an HDMI source device involves sending a message from the HDMI source device via an HDMI interface that queries whether an HDMI sink device can receive closed captioning (CC) data via the HDMI interface at 304; receiving an indication from the HDMI sink device that either affirms that the HDMI sink device can receive CC data via the HDMI interface or establishes that the HDMI sink device cannot receive CC data via the HDMI interface at 312; if the HDMI sink device affirms that the HDMI sink device can receive the CC data via the HDMI interface as packetized data, then sending the HDMI CC data to the HDMI sink device via the HDMI interface at 312; and if the HDMI sink device cannot receive the CC data via the HDMI interface, then rendering the closed captioning data at the HDMI source device if closed captioning is enabled by a user setting to display closed captioning data at the HDMI source device.

In certain implementations, the HDMI sink device is established to not be capable of receiving CC data via the HDMI interface by a failure to receive a response to the message from the HDMI source device while in other implementations, the HDMI sink device's ability to receive CC data from the HDMI source device via the HDMI interface is established by a message received from the HDMI sink device. In various implementations, the CC data is sent from the HDMI source device as packets over an Internet Protocol channel or the HDMI CEC lines. The CC data can also be sent via IP packets containing identification headers and time stamps that relate the CC data to associated video and can be sent via IP packets that are multicast-addressed. In certain implementations, the CC data is sent via IP packets encapsulating data structures which include a "type" header followed by a number of data bytes.

In another implementation, a method carried out at an HDMI source device involves sending a message from the HDMI source device via an HDMI interface that queries whether an HDMI sink device can receive closed captioning (CC) data via the HDMI interface; receiving an indication from the HDMI sink device that either affirms that the HDMI sink device can receive CC data via the HDMI interface or establishes that the HDMI sink device cannot receive CC data via the HDMI interface; if the HDMI sink device affirms that the HDMI sink device can receive the CC data via the HDMI interface as packetized data, then sending the HDMI CC data to the HDMI sink device via the HDMI interface, where the HDMI sink device's ability to receive CC data from the HDMI source device via the HDMI interface is established by a message received from the HDMI sink device; if the HDMI sink device cannot receive the CC data via the HDMI interface, then rendering the closed captioning data at the HDMI source device if closed captioning is enabled by a user setting to display closed captioning data at the HDMI source device; where the HDMI sink device is established to not be capable of receiving CC data via the HDMI interface by either a failure to receive a response to the message from the HDMI source device or by receipt of a message indicating that the HDMI sink device cannot receive CC data via the HDMI interface; where the CC data is sent from the HDMI source device as packets over an Internet Protocol channel in multicast addressed IP packets containing identification headers and time stamps that relate the CC data to associated video, and where the IP packets encapsulate data structures which include a "type" header followed by a number of data bytes.

A method carried out at an HDMI sink device can involve receiving a message such as 304 from an HDMI source device via an HDMI interface that queries whether the HDMI sink device can receive closed captioning (CC) data via the HDMI interface. The sink device can respond at 406 by sending a message from the HDMI sink device affirming that the HDMI sink device can receive CC data via the HDMI interface at 422. The CC data can then be received via the HDMI interface as packetized data. If the HDMI sink device is enabled by a user setting to display closed captioning data, then rendering the closed captioning data as video at the HDMI sink device 426.

In certain implementations, the CC data is received from the HDMI source device as packets over an Internet Protocol channel or using the HDMI CEC lines. The CC data can be received via IP packets containing identification headers and time stamps that relate the CC data to associated video. Additionally, the CC data can be received via IP packets that are multicast-addressed. In certain implementations, the CC data is received via IP packets encapsulating data structures which include a "type" header followed by a number of data bytes.

Another method carried out at an HDMI sink device involves receiving a message from an HDMI source device via an HDMI interface that queries at 304 whether the HDMI sink device can receive closed captioning (CC) data via the HDMI interface; sending a message from the HDMI sink device at 406 affirming that the HDMI sink device can receive CC data via the HDMI interface; receiving the CC data via the HDMI interface as packetized data; and if the HDMI sink device is enabled by a user setting to display closed captioning data, then rendering the closed captioning data at 426 as video at the HDMI sink device; where the CC data is received from the HDMI source device as packets over an Internet Protocol channel in multicast-addressed IP packets containing identification headers and time stamps that relate the CC data to associated video, and where the IP packets encapsulate data structures which include a "type" header followed by a number of data bytes.

Any of the above methods can be implemented in a storage medium such as a non-transitory computer readable storage medium storing instructions which, when executed on one or more programmed processors, carry out the method.

FIG. 5 depicts an HDMI compatible A/V device that includes an HDMI interface 500 having an HDMI connector 504 that sends HDMI A/V data and CC data to an HDMI sink device (not shown in this figure) via connector 504. The HDMI data is passed from the connector 504 via a bus that carries all of the HDMI signals, including, power and ground connections. The HDMI transmitter circuit 508 receives signals from an IP packet processor 512. The IP packet processor further receives CC data from a closed captioning data packager 516 that packages the CC data from a source of CC data 520 for separate transmission via the HDMI connector to another A/V device. The current A/V device carries out an A/V function designated generally as 524. In the case of this A/V function, the device of FIG. 5, designated 530 generally, is preferably not television set, but ultimately the CC data is preferably sent to a television set having a television display so that the rendering done at rendering circuit such as 620 of A/V device 630 of FIG. 6 so that the rendering can be done in the optimum way for the present display.

FIG. 6 depicts an HDMI compatible A/V device that includes an HDMI interface 600 having an HDMI connector 604 that receives HDMI A/V data and CC data from an HDMI source device. The HDMI data is passed from the connector 604 via a bus that carries all of the HDMI signals, including, power and ground connections to an HDMI receiver circuit 608. An IP packet processor 612 receives IP packets and sends them to a closed captioning data parser 616 that separates out the CC data for separate transmission to the A/V device's closed captioning rendering circuit 620. The A/V device carries out an A/V function designated generally as 624. In the case of this A/V function, the device of FIG. 6, designated 630 generally, is preferably a television set having a television display so that the rendering done at rendering circuit 620 can be done in the optimum way for the present display. However, this preference is not to be considered limiting since an intermediate device may be preferable or equivalent in some situations.

Those skilled in the art will appreciate that many variations of the HDMI interface configurations depicted in FIG. 5 and FIG. 6 are possible upon consideration of the present teachings. For example, an HDMI device that simply passes through HDMI signals may be simplified substantially. Moreover, devices can be compatible with interoperation without need to either render or package CC data packets in certain situations. These variations will be clear to those skilled in the art upon consideration of the present teachings.

This CC data may be aggregated, tagged and organized, and encapsulated into IP packets and multiplexed together to be sent across the HDMI cable using the Ethernet channel. An IP-based protocol can use multicast-addressed IP packets encapsulating data structures which include a "type" header followed by a number of data bytes.

This technique is quite useful for providing the data directly to a digital television so the user can depend upon the digital television and its user interface to access and control closed captions rather than having to deal with setting up various sources that might be connected to the digital television. In this manner, the receiver device may control the rendering of closed caption rendering internally, rather than relying on the source device;

Thus, in one implementation, an HDMI apparatus such as 530 has an HDMI interface that sends data via an HDMI connector 504. An HDMI packet processor such as 512: sends a message from via the HDMI interface that queries whether an HDMI sink device can receive closed captioning (CC) data via the HDMI interface; receives an indication from the HDMI sink device via the HDMI interface that either affirms that the HDMI sink device can receive CC data via the HDMI interface or establishes that the HDMI sink device cannot receive CC data via the HDMI interface; and if the HDMI sink device affirms that the HDMI sink device can receive the CC data via the HDMI interface as packetized data from 516, then sends the HDMI CC data to the HDMI sink device via the HDMI interface 500.

In certain implementations, the HDMI sink device is established to not be capable of receiving CC data via the HDMI interface by a failure to receive a response to the message while in other implementations the HDMI sink device's ability to receive CC data via the HDMI interface is established by a message received from the HDMI sink device. The CC data can be sent as packets over an Internet Protocol channel or can be send using the HDMI CEC lines. The CC data can be sent via IP packets containing identification headers and time stamps that relate the CC data to associated video. The CC data can be sent via IP packets that are multicast-addressed. The CC data can also be sent via IP packets encapsulating data structures which include a "type" header followed by a number of data bytes.

In another implementation, an HDMI apparatus such as 630 has an HDMI interface that receives data via an HDMI connector such as 604. A HDMI packet processor receives a message from an HDMI source device via an HDMI interface that queries whether the HDMI apparatus can receive closed captioning (CC) data via the HDMI interface; sends a message affirming that the HDMI apparatus can receive CC data via the HDMI interface; and receives the CC data via the HDMI interface as packetized data.

In certain implementations, the CC data is received as packets over an Internet Protocol channel while in other implementations the CC data is received using the HDMI CEC lines. The CC data can be received via IP packets containing identification headers and time stamps that relate the CC data to associated video. The CC data can be received via IP packets that are multicast-addressed. The CC data can also be received via IP packets encapsulating data structures which include a “type” header followed by a number of data bytes.

Other variations can be envisioned by those skilled in the art upon consideration of the present teachings.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments. For example, the packet processing of the HDMI interfaces may be implemented using hard wired logic processor.

Certain embodiments described herein, are or may be implemented using a programmed or hard wired processor executing programming instructions or actions that are broadly described above in the form of signal flow chart diagrams and other explanations that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method carried out at an HDMI source device, comprising:

sending a handshake message from the HDMI source device via an HDMI interface to a display device;

where the handshake message queries the display device as to the highest version level of HDMI that is supported by the display device so as to ascertain whether the display device can receive digital packetized closed captioning (CC) data via the HDMI interface using Internet protocol packets in an HDMI Internet Protocol channel for rendering by the display device;

attempting to receive a handshake response from the display device via the HDMI interface that either affirms that the display device can receive digital CC data via the HDMI interface using Internet protocol packets and render the digital CC data at the display device or establishes that the display device cannot receive digital CC data via the HDMI interface using Internet protocol packets and render the digital CC data at the display device, where the Internet protocol packets comprise Internet protocol packets conveyed via the HDMI Internet Protocol channel;

if the display device affirms that the display device can receive the digital CC data via the HDMI interface as Internet protocol packetized data and render the digital CC data by a reply that indicates that the display device can support version 1.4 of HDMI or later, then the HDMI source device sending the HDMI digital CC data to the display device for rendering when closed caption rendering by the display device is enabled at the display device via the HDMI interface using Internet protocol packets in the HDMI Internet Protocol channel; and if the display device cannot receive the digital CC data via the HDMI interface using Internet protocol packets and hence cannot render the digital CC data, then rendering the closed captioning data at the HDMI source device if closed captioning is enabled by a user setting to display closed captioning data at the HDMI source device and sending the rendered closed captioning as a rendered part of a video signal to the display device.

2. The method according to claim 1, where the display device is established to not be capable of receiving digital CC data via the HDMI interface using Internet protocol packets in an HDMI Internet Protocol channel by a failure to receive a handshake response to the handshake message from the HDMI source device.

3. The method according to claim 1, where the display device's ability to receive digital CC data from the HDMI source device via the HDMI interface is established by the handshake message received from the display device that indicates that the display device can support version 1.4 of HDMI or later via the HDMI Internet Protocol channel.

4. The method according to claim 1, where the digital CC data is sent from the HDMI source device as packets over the HDMI Internet Protocol channel.

5. The method according to claim 1, where the handshake message is sent from the HDMI source device using the HDMI CEC lines.

6. The method according to claim 1, where the digital CC data is sent via IP packets containing identification headers and time stamps that relate the digital CC data to associated video.

7. The method according to claim 1, where the digital CC data is sent via IP packets that are multicast-addressed.

8. The method according to claim 1, where the digital CC data is sent via IP packets encapsulating data structures which include a “type” header followed by a number of data bytes.

9. A non-transitory computer readable storage medium storing instructions which, when executed on one or more programmed processors, carry out a method according to claim 1.

10. A method carried out at an HDMI source device, comprising:

sending a handshake message from the HDMI source device via an HDMI interface to a display device;

where the handshake message queries the display device as to the highest version level of HDMI that is supported by the display device so as to ascertain whether the display device can receive packetized digital closed captioning (CC) data via the HDMI interface using Internet protocol packets in an HDMI Internet Protocol channel for rendering by the display device;

attempting to receive a handshake response from the display device via the HDMI interface that either affirms that the display device can receive digital CC data via the HDMI interface using Internet protocol packets and render the digital CC data at the display device or establishes that the display device cannot receive digital CC data via the HDMI interface using Internet protocol packets and render the digital CC data at the display device, where the Internet protocol packets comprise Internet protocol packets conveyed via the HDMI Internet Protocol channel;

if the display device affirms that the display device can receive the digital CC data via the HDMI interface as Internet protocol packetized data and render the digital CC data by a reply that indicates that the display device can support version 1.4 of HDMI or later in the HDMI Internet Protocol channel, then the display device sending the digital HDMI CC data to the display device for rendering when closed captioning rendering by the display device is enabled at the display device via the HDMI interface using Internet protocol packets in the HDMI Internet Protocol channel, where the display device's ability to receive digital CC data from the HDMI source device via the HDMI interface is established by a message received from the display device;

if the display device cannot receive the digital CC data via the HDMI interface using Internet protocol packets in an HDMI Internet Protocol channel and hence cannot render the digital CC data, then rendering the closed captioning data at the HDMI source device if closed captioning is enabled by a user setting to display closed captioning data at the HDMI source device and sending the rendered closed captioning as a rendered part of a video signal to the display device;

where the display device is established to not be capable of receiving the digital CC data via the HDMI interface using Internet protocol packets in the HDMI Internet Protocol channel by either a failure to receive a handshake response to the message from the HDMI source device or by receipt of a handshake response message indicating that the display device cannot receive digital CC data via the HDMI interface using Internet protocol packets;

where the digital CC data is sent from the HDMI source device as packets over an Internet Protocol channel in multicast addressed Internet protocol packets in the HDMI Internet Protocol channel containing identification headers and time stamps that relate the digital CC data to associated video, and where the Internet protocol packets encapsulate data structures which include a "type" header followed by a number of data bytes.

11. A method carried out at a display device, comprising:

receiving a handshake message from an HDMI source device via an HDMI interface that queries the display device as to the highest version level of HDMI that is supported by the display device so as to ascertain whether the display device can receive digital closed captioning (CC) data via the HDMI interface using Internet protocol packets in an HDMI Internet Protocol channel and can render the digital closed captioning data at the display device;

sending a handshake message from the display device affirming that the display device can receive digital CC data via the HDMI interface using Internet protocol packets in the HDMI Internet Protocol channel by a reply that indicates that the display device can support version 1.4 of HDMI or later;

receiving the digital CC data via the HDMI interface as Internet protocol packetized data in the HDMI Internet Protocol channel; and if the display device is enabled by a user setting to display closed captioning data, then the display device carrying out a process of rendering the digital closed captioning data as video at the display device.

12. The method according to claim 11, where the message from the HDMI source device is received from the HDMI source device as packets over an Internet Protocol channel.

13. The method according to claim 11, where the message from the HDMI source device is received from the HDMI source device using the HDMI CEC lines.

14. The method according to claim 11, where the digital CC data is received via IP packets containing identification headers and time stamps that relate the digital CC data to associated video.

15. The method according to claim 11, where the digital CC data is received via IP packets that are multicast-addressed.

16. The method according to claim 11, where the digital CC data is received via IP packets encapsulating data structures which include a "type" header followed by a number of data bytes.

17. A non-transitory computer readable storage medium storing instructions which, when executed on one or more programmed processors, carry out a method according to claim 11.

18. A method carried out at a display device, comprising:

receiving a handshake message from an HDMI source device via an HDMI interface that queries the display device as to the highest version level of HDMI that is supported by the display device so as to ascertain whether the display device can receive digital closed captioning (CC) data via the HDMI interface using Internet protocol packets in an HDMI Internet Protocol channel and render the digital CC data at the display device;

sending a handshake message from the display device affirming that the display device can receive digital CC data via the HDMI interface using Internet protocol packets in the HDMI Internet Protocol channel and can render the digital CC data at the display device;

receiving the digital CC data via the HDMI interface as Internet protocol packetized data; and if the display device is enabled by a user setting to display closed captioning data, then rendering the digital closed captioning data as video at the display device;

where the digital CC data is received from the HDMI source device as packets over an Internet Protocol channel in multicast-addressed IP packets containing identification headers and time stamps that relate the digital CC data to associated video, and where the IP packets encapsulate data structures which include a "type" header followed by a number of data bytes.

19. An HDMI apparatus, comprising:

an HDMI interface that sends data via an HDMI connector;

an HDMI packet processor that:

sends a handshake message from via the HDMI interface that queries an display device as to the highest version level of HDMI that is supported by the display device so as to ascertain whether the display device can receive digital closed captioning (CC) data via the HDMI interface as Internet protocol packets in an HDMI Internet Protocol channel and can render the digital CC data as video;

attempts to receive an indication from the display device via the HDMI interface that either affirms that the display device can receive digital CC data via the HDMI interface as Internet protocol packets and render digital CC data as video or establishes that the display device cannot receive digital CC data via the HDMI interface as Internet protocol packets in the HDMI Internet Protocol channel and render digital CC data as video; and if the display device affirms that the display device can receive the digital CC data via the HDMI interface as Internet protocol packetized data and render the digital CC data as video by a reply that indicates that the display device can support version 1.4 of HDMI or later, then the HDMI source device sends the HDMI digital CC data to the display device via the HDMI interface using Internet protocol packets in the HDMI Internet Protocol channel for rendering by the display device as video.

20. The apparatus according to claim 19, where the display device is established to not be capable of receiving digital CC data via the HDMI interface by a failure to receive a response to the message.

21. The apparatus according to claim 19, where the display device's ability to receive digital CC data via the HDMI interface is established by a handshake message received from the display device that indicates that the display device can support version 1.4 of HDMI or later over the Internet protocol channel.

22. The apparatus according to claim 19, where the handshake message from the display device is sent as Internet protocol packets over an Internet Protocol channel.

23. The apparatus according to claim 19, where the message from the HDMI source device is sent using the HDMI CEC lines.

24. The apparatus according to claim 19, where the digital CC data is sent via Internet protocol packets containing identification headers and time stamps that relate the digital CC data to associated video.

25. The apparatus according to claim 19, where the digital CC data is sent via Internet protocol packets that are multicast-addressed.

26. The apparatus according to claim 19, where the digital CC data is sent via Internet protocol packets encapsulating data structures which include a "type" header followed by a number of data bytes.

27. An HDMI sink apparatus, comprising:

an HDMI interface that receives data via an HDMI connector;

an HDMI packet processor that is configured to:

receive a handshake message from an HDMI source device via HDMI interface that queries as to the highest version level of HDMI that is supported by the HDMI sink apparatus so as to ascertain whether the HDMI sink apparatus can receive digital closed captioning (CC) data via the HDMI interface as Internet protocol packets in an HDMI Internet Protocol channel and can render the digital CC data as video;

send a handshake message affirming that the HDMI sink apparatus can receive digital CC data via the HDMI interface as Internet protocol packets in the HDMI Internet Protocol channel and can render the digital CC data as video, where the handshake message indicates that the HDMI sink apparatus can support version 1.4 of HDMI or later; and receive the digital CC data via the HDMI interface as Internet protocol packetized data.

28. The apparatus according to claim 27, where the message from the HDMI sink apparatus is received as packets over an Internet Protocol channel.

29. The apparatus according to claim 27, where the message from the HDMI sink apparatus is received using the HDMI CEC lines.

30. The apparatus according to claim 27, where the digital CC data is received via Internet protocol packets containing identification headers and time stamps that relate the digital CC data to associated video.

31. The apparatus according to claim 27, where the digital CC data is received via Internet protocol packets that are multicast-addressed.

32. The method according to claim 27, where the digital CC data is received via Internet protocol packets encapsulating data structures which include a "type" header followed by a number of data bytes.

* * * * *